Dec. 28, 1948.　　　　P. R. GUERIN　　　　2,457,366
INDUSTRIAL TRUCK

Filed Aug. 29, 1946　　　　　　　　　　　　3 Sheets-Sheet 1

INVENTOR.
Paul R. Guerin.
BY
Hull & West,
ATTYS.

Dec. 28, 1948.   P. R. GUERIN   2,457,366
INDUSTRIAL TRUCK
Filed Aug. 29, 1946   3 Sheets-Sheet 3

INVENTOR.
Paul R. Guerin,
BY
Hull West,
ATTYS.

Patented Dec. 28, 1948

2,457,366

UNITED STATES PATENT OFFICE 2,457,366

INDUSTRIAL TRUCK

Paul R. Guerin, East Cleveland, Ohio, assignor to Towmotor Corporation, Cleveland, Ohio, a corporation of Ohio Application August 29, 1946, Serial No. 693,644

1 Claim. (Cl. 214—113)

This invention relates to a novel construction of hose reel, and more particularly to a hose reel which is supported upon an industrial truck; hoses leading to opposite ends of an operating cylinder which may be mounted upon and movable with the main carriage of said truck and which carriage is raised and lowered along the vertical mast with which such truck is provided.

Among the general objects of the invention are to provide a hose reel of this type with particularly efficient means for supplying operating fluid, through the central support upon which it is rotatably mounted, to the hoses on said reel; also to provide the said reel with means whereby it may be conveniently mounted upon and incorporated with the front portion of an industrial truck.

Further and more limited objects of the invention will appear in connection with the description and drawings hereof and will be realized by the combinations of elements covered by the respective claims appended hereto.

Figure 1:
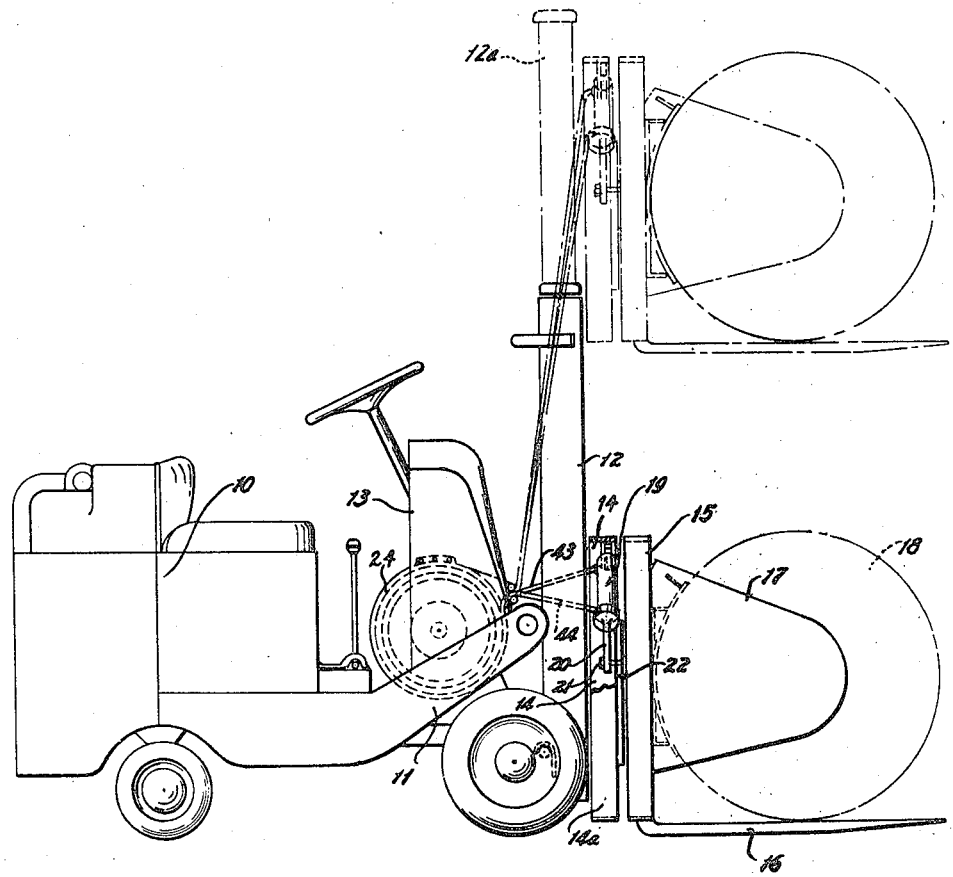
Figure 5:
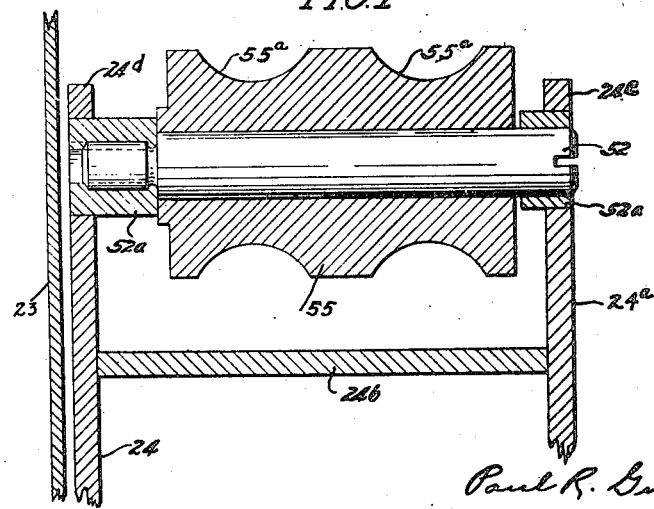
Figure 2:
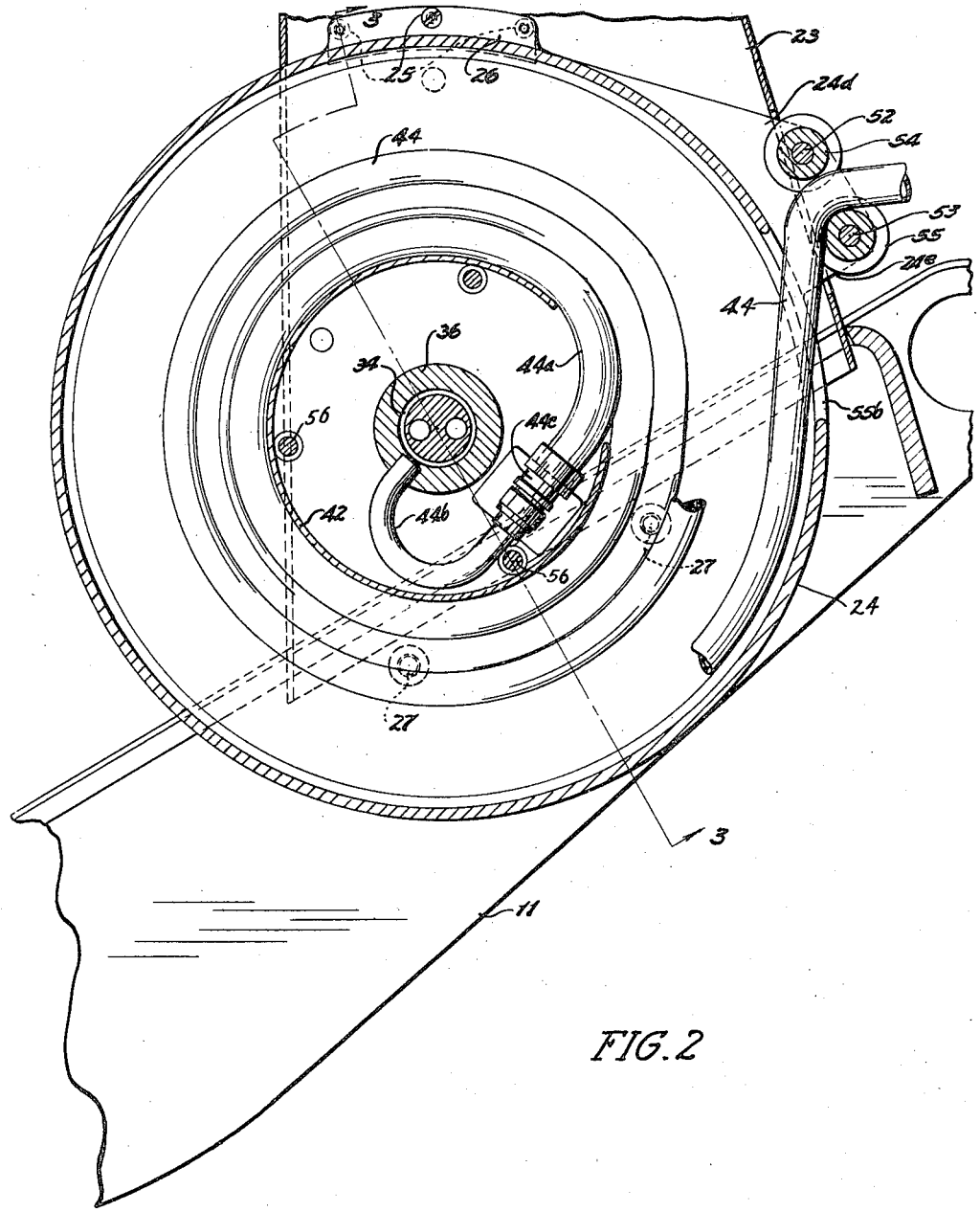
Figure 3:
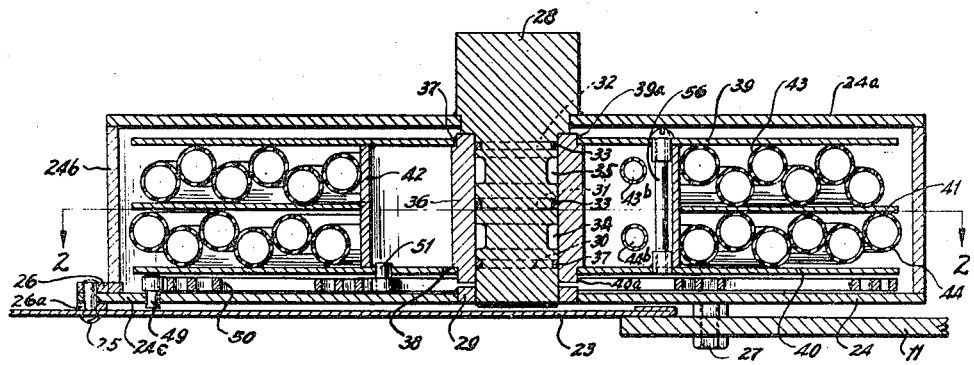
Figure 4:
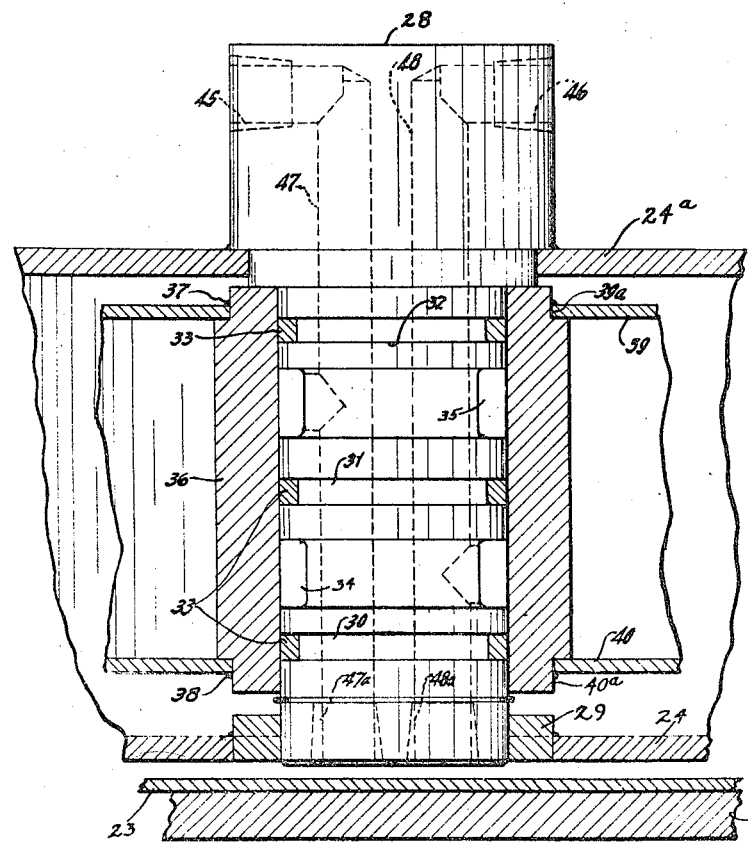

Referring to the drawings, Fig. 1 represents a somewhat diagrammatic side elevational view of an industrial truck of the type with which my invention may be advantageously employed and illustrating the manner in which the reel is mounted upon the said truck and also the manner in which the delivery ends of the hoses are connected with an operating cylinder mounted upon the carriage of said truck which is vertically movable along the mast thereof; Fig. 2 is a vertical sectional view through the reel, corresponding substantially to the line 2—2 of Fig. 3 and looking in the direction of the arrows, and showing the parts by which it is supported on the truck; Fig. 3 is a sectional view corresponding to the line 3—3 of Fig. 2 and looking in the direction of the arrows; Fig. 4 is a detail in section of the central portion of the reel showing the construction of the hub and supporting spindle, the body of the spindle being shown in elevation; and Fig. 5 is a detail in section showing one of the hose-guide rollers and the mounting therefor whereby the hoses are guided as they are wound upon and withdrawn from the reel.

Describing by reference characters the various parts shown in the drawings, 10 denotes, somewhat diagrammatically, the body of an industrial truck of a well known type, the same being provided with side frame members comprising upturned front portions 11, 12 denotes one of the lower side members of a mast the lower portion of which is supported for pivotal movement about a horizontal axis, in a well-known manner. 13 denotes the hood, the same being provided with a floor supported by the bottom portions of the upturned portions 11 of the side frame members.

14a denotes one of the sides of a main supporting carriage 14 mounted upon and vertically movable along the lower side members 12 of the mast and along the side members 12a of its extension, the carriage being raised and lowered, preferably by means of a cylinder and plunger interposed between the lower side members 12 of the mast and having a cross head, the opposite ends of which support rollers, with chains secured each at one end to a non-movable portion of the truck and at their opposite ends to the carriage 14. This construction, as well as the means for pivotally supporting the lower end of the mast 12 are old and well known in this art and are shown, for instance, in the patent to Weaver No. 2,299,445, issued October 20, 1942.

15 denotes a platform which is rotatably mounted upon an arbor carried by the main or supporting carriage 14 and is provided with lifting forks 16; also with a supporting member 17 secured to one side thereof, the same being in the general form of a scoop and which is adapted to engage one end of an object, such as a paper roll 18, thereby to support the latter when the carriage 15 is rotated about its supporting axis. The manner in which the platform 15 is rotatably supported upon the carriage 14 does not constitute, in its details, any part of the invention intended to be protected herein, and it may be of the type shown in the patent to Lehmann et al. No. 2,281,004, issued April 28, 1942.

19 denotes a cylinder which is supported by the main carriage 14, the piston rod 20 whereof is connected to the rotatable carriage 15, as by a pin 21 and a plate 22 secured to the rear of the latter carriage.

For the purpose of supplying operating fluid to opposite ends of the cylinder, I have provided the front of the truck proper with a reel by which hoses for supplying such fluid to opposite ends of said cylinder are supported. 23 denotes one of the side walls of the hood 13 which is secured at its lower end to the member 11 (see Fig. 2). 24 denotes the bottom, 24a the top and 24b the side of a cylindrical reel casing which is fastened at its upper end to the wall 23 as by means of rivets 25 extending through the said wall, through an extension 24c of the bottom wall 24, through an upper clamping member 26 and through a washer 26a. The lower portion of the wall 24 is secured to one of the side members 11, as by means of bolts 27.

28 denotes a dual-ported fixed spindle the lower end of which is anchored to and within a central collar 29 provided therefor on and secured to the bottom plate 24. This spindle is cylindrical in contour and is provided with grooves 30, 31 and 32 extending therearound for the reception of piston-type sealing rings 33. Between the grooves 30 and 31 a wide annular channel 34 is provided and a similar channel 35 is provided between the grooves 31 and 32.

36 denotes a hub which is mounted for rotation upon the body portion of the spindle 28 and which provides annular passages with the channels 34 and 35, to form a swivel fluid joint.

Extending around the top and bottom of the hub are angular seats 37 and 38 upon which seats there are secured the inner cylindrical edges 39$^a$ and 40$^a$ of upper and lower annular plates 39 and 40 of the reel. An annular plate 41 the periphery whereof is of the same extent as the peripheries of the plates 39 and 40 is located intermediately between the former plates and is welded at its inner edge to a wall 42 which extends between and which is welded to the plates 39 and 40. The wall 42 is substantially cylindrical in extent, being concentric with the axis of the spindle 28, and having its ends separated for the introduction thereinto of the fluid-receiving inner end portions 43$^a$ and 44$^a$ of hoses 43 and 44, respectively, which are wound about the wall 42 and above and below the plate 41, respectively.

The spindle 28 is provided with connections 45 and 46 for the supply of operating fluid through vertical passages 47 and 48 respectively to the annular channels 35 and 34, respectively. These passages are conveniently drilled from the bottom of the spindle, the bottoms of the said passages being closed by means of plugs 47$^a$ and 48$^a$.

Short pipe connections and couplings connect the inner ends of the hoses 43 and 44 with the channels 34 and 35 respectively. The manner in which these connections are made is shown more particularly in Fig. 2 in connection with the inner end 44$^a$ of the hose 44 and wherein a short pipe connection 44$^b$ which extends through the wall of the hub 36 and communicates with the annular channel 34 is in turn connected to the inner end 44$^a$ of the hose 44 by means of a suitable coupling 44$^c$. The manner of connecting the inner end 43$^a$ of the lower hose 43 to the annular channel 35 is identical with that described for connecting the hose 44 with the channel 34 and hence needs no separate illustration, the short pipe connection corresponding to 43$^b$ being shown at 44$^b$, Fig. 3.

49 denotes a short anchoring post carried by the bottom plate 24 of the reel casing and to which one end of a coil spring 50 is secured, the spring being wound about the lower ends of the spindle 28 and hub 36 and having its inner end secured to a post 51 carried by the bottom plate 40 of the rotatable portion of the reel.

52 and 53 denote upper and lower journal pins supported by bearings 52$^a$ in lip-like extensions 24$^d$ and 24$^e$ of the bottom and top members of the casing. Each of these journal pins supports rollers 54 and 55, respectively.

These rollers are provided each with a pair of grooves extending therearound, as shown at 55$^a$ in the lower roller 55 on Fig. 5, the grooves on one roller being directly opposed and complementary to the grooves on the other, whereby they provide roller guides for the hoses 43 and 44 extending outwardly with respect to the opening 55$^b$ in the wall 24$^b$. From these guides, the hoses extend to opposite ends of the cylinder 19.

The plates 39 and 40 of the reel proper are connected and maintained in spaced relation to each other by means of bolts 56 located within the wall 42.

With the parts constructed and arranged as described, it is believed that the operation will be readily understood. When the main supporting carriage 14 is elevated, the hoses are unwound from the respective portions of the reel by rotation of the latter against the action of the spring 50. Assuming that an object, such as the roll 18, has been picked up by the forks 16 and that it is desired to tilt the rotatable platform 15, operating fluid will be supplied through the appropriate hose to the appropriate end of the cylinder 19, thereby to impart rotary movement to the platform 15 and enable the scoop 17 to support the roll 18 in a vertical position. When the roll has been elevated to a sufficient height by the carriage 14 and the truck moved to the place desired for delivery of the roll, operating fluid will be supplied to the opposite end of the cylinder through the appropriate hose, the platform 15 will be rotated thereby to a position to enable the roll to be deposited, after which the platform 15 may be restored to its load-receiving position and the supporting platform lowered to such position, the spring 50 winding in both of the hoses during the descending movement of the carriage 14.

The manner of supplying the operating fluid through the supporting spindle 28 enables the interior of the hub and the exterior of the spindle to be lubricated, where oil is employed as the fluid for operating the rotatable carriage.

For convenience of description, the hose reel and its casing have been assumed to be supported in a position wherein the casing wall 24$^a$ is above the wall 24 and wherein the plate 39 is above the plate 40, and the terms "top" and "bottom" and "upper" and "lower" have been applied to the same and to other parts of the device and will be applied to the same in the claims, but without any intention of limiting the positions which these parts may assume in actual use.

Having thus described my invention, what I claim is:

A lift truck comprising a mobile chassis assembly, vertical mast means mounted forwardly on said assembly, a carriage slidable on said mast means, power means for raising said carriage, said carriage comprising a support mounted on said mast means and a load carrying member movably mounted on said support, a double acting piston and cylinder assembly mounted on said carriage and arranged for moving said load carrying member on said support, a reel mounted on said chassis assembly and disposed behind said mast adjacent a lower portion thereof, conduit guide means disposed forwardly of said reel, said reel and mounting including dual-ported fixed means cooperating with reel hub means to form a swivel fluid joint, a pair of flexible conduits, each conduit being connected at one end to said hub means, passed about said reel and over said guide means, and connected at the other end to one end of said carriage mounted cylinder, and means to connect a source of fluid under pressure to said fixed ported means.

PAUL R. GUERIN.

REFERENCES CITED

The following references are of record in the file of this patent:

UNITED STATES PATENTS

| Number | Name | Date |
| --- | --- | --- |
| 416,053 | Pelkey | Dec. 24, 1889 |
| 1,573,439 | Bedford | Feb. 16, 1926 |
| 1,914,654 | Tornblom | June 20, 1933 |
| 2,071,174 | Parker | Feb. 16, 1937 |
| 2,270,664 | Weaver | Jan. 20, 1942 |